No. 673,341. Patented Apr. 30, 1901.
R. B. PRICE.
APPARATUS FOR MOUNTING TIRES.
(Application filed Sept. 25, 1900.)
(No Model.) 4 Sheets—Sheet 1.
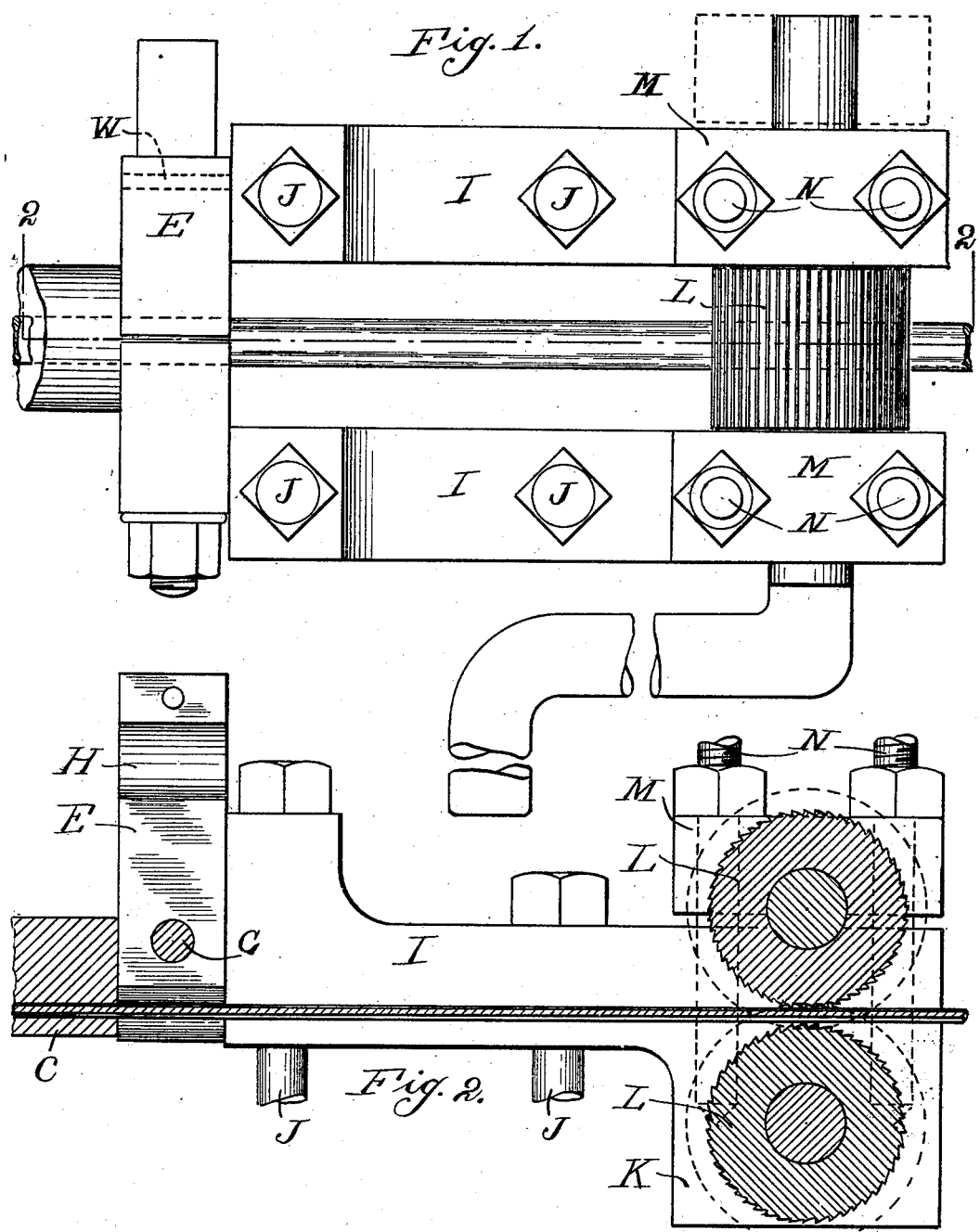
Witnesses:
E. F. Wilson
Jno. J. Snowhook
Inventor.
Raymond B. Price
By Rudolph Wm. Lotz
Attorney

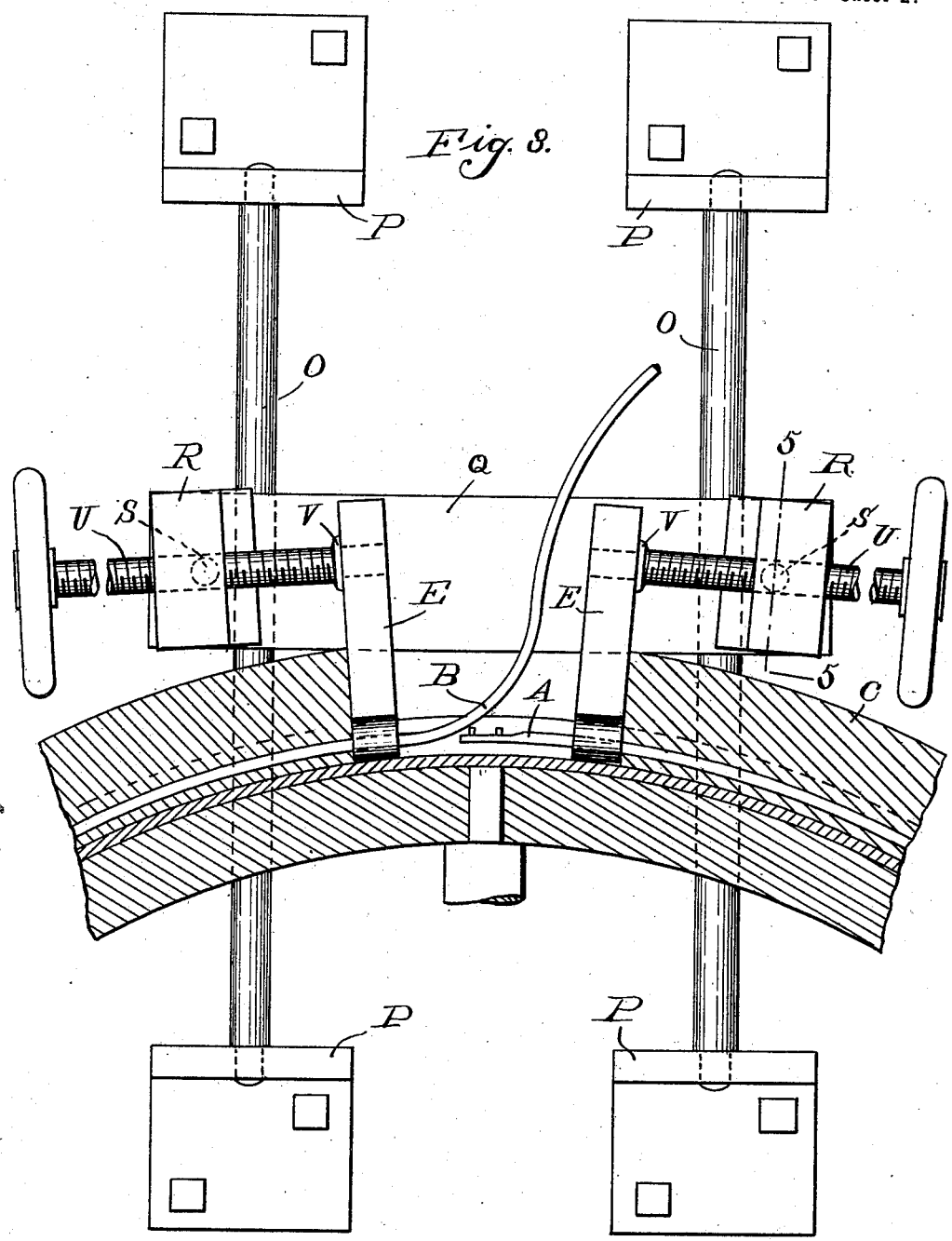

No. 673,341. Patented Apr. 30, 1901.
R. B. PRICE.
APPARATUS FOR MOUNTING TIRES.
(Application filed Sept. 25, 1900.)
(No Model.) 4 Sheets—Sheet 3.
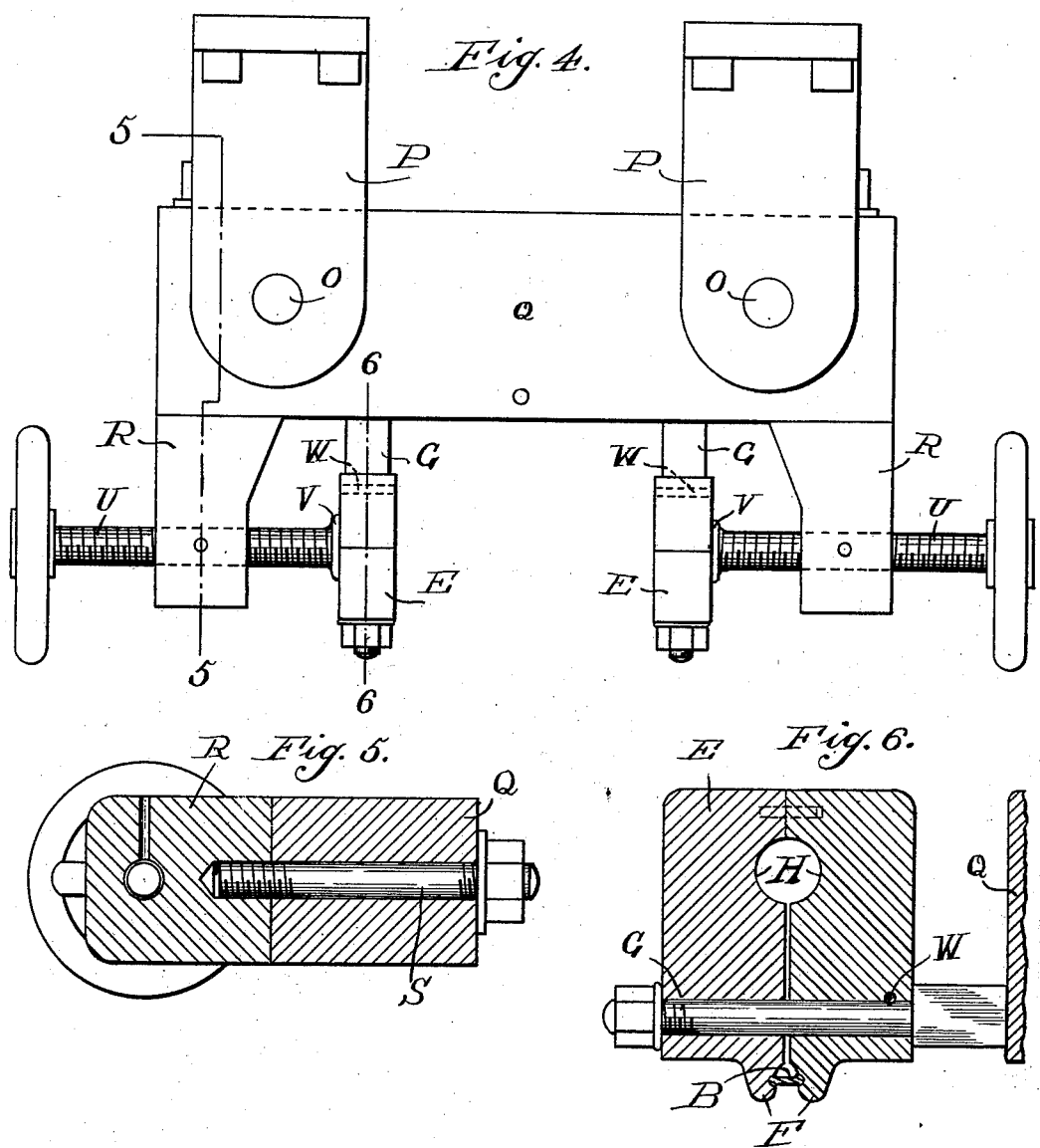
Witnesses:
E. F. Wilson
Jno. J. Snowhook
Inventor
Raymond B. Price
By Rudolph Wm. Lotz
Attorney No. 673,341. Patented Apr. 30, 1901.
R. B. PRICE.
APPARATUS FOR MOUNTING TIRES.
(Application filed Sept. 25, 1900.)
(No Model.) 4 Sheets—Sheet 4.
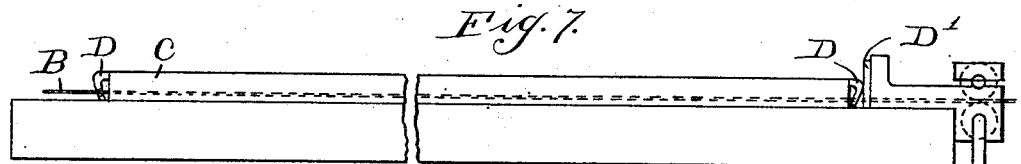
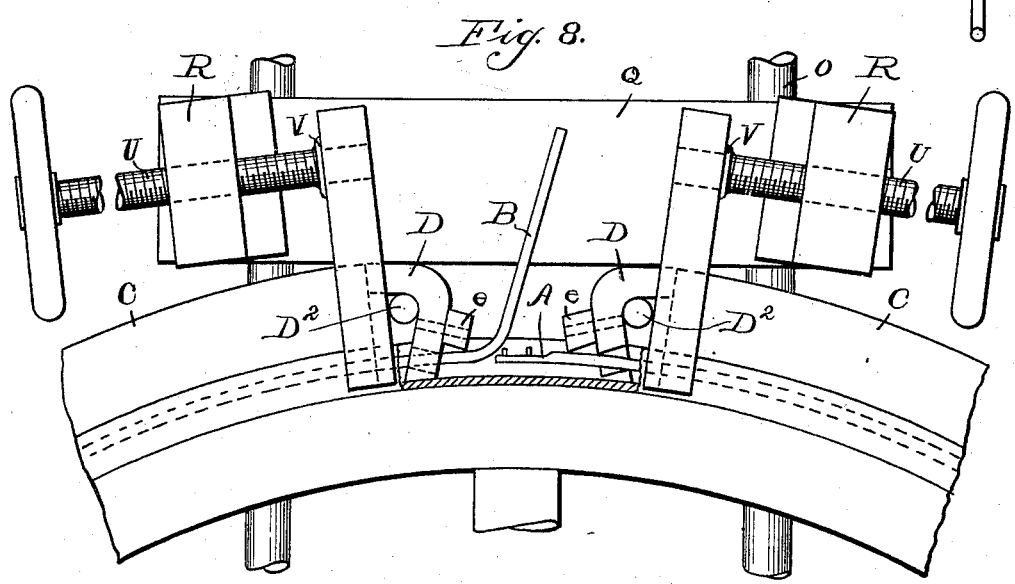
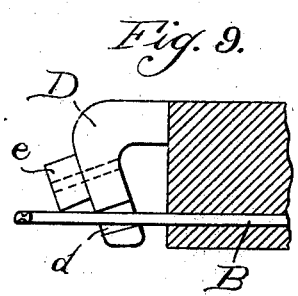 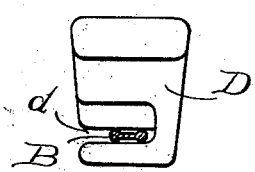 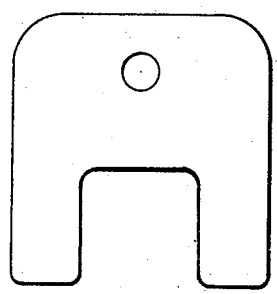
Witnesses:
E. F. Wilson
Jno. J. Snowhook
Inventor:
Raymond B. Price
By Rudolph ___
Attorney
THE NORRIS PETERS CO., PHOTO-LITHO., WASHINGTON, D. C.

UNITED STATES PATENT OFFICE.

RAYMOND B. PRICE, OF CHICAGO, ILLINOIS.

APPARATUS FOR MOUNTING TIRES.

SPECIFICATION forming part of Letters Patent No. 673,341, dated April 30, 1901.

Application filed September 25, 1900. Serial No. 31,041. (No model.)

*To all whom it may concern:*

Be it known that I, RAYMOND B. PRICE, a citizen of the United States, residing at Chicago, in the county of Cook and State of Illinois, have invented certain new and useful Improvements in Apparatus for Mounting Tires; and I do hereby declare the following to be a full, clear, and exact description of the invention, such as will enable others skilled in the art to which it appertains to make and use the same.

This invention relates to a novel apparatus for mounting rubber vehicle-tires in rims or channels, the object being to provide means of this character which will enable the operator to quickly compress the rubber on the fastening band or wires and subsequently enable him to readily put any desired tension on said band or wires and hold same at such tension while the ends are being connected together; and it consists in the features of construction and combinations of parts hereinafter fully described and claimed.

In the accompanying drawings, illustrating this invention, Figure 1 is a top plan view of that part of the apparatus by means of which the rubber is compressed on the band. Fig. 2 is a vertical longitudinal section of same on the line 2 2 of Fig. 1. Fig. 3 is a front elevation of that part of the apparatus by means of which the necessary tension is applied to the band and showing a fragmentary section of a wheel with the tire in place and tension applied to the band. Fig. 4 is a top plan view of the device shown in Fig. 3. Fig. 5 is a section on the line 5 5 of Fig. 4. Fig. 6 is a section on the line 6 6 of Fig. 4. Fig. 7 is a front elevation of a bench or table, showing the compressing device and tire and also clips on the fastening-band of the tire for holding the compression in the tire. Fig. 8 is a fragmentary front elevation of the device shown in Fig. 3, showing another manner of putting tension on the fastening-band. Figs. 9 and 10 are detail views of the clips. Fig. 11 is a view in elevation of a plate used in connection with the clips and the tension device for placing the fastening band or wires under tension.

In mounting rubber tires on wheels it is essential to the resiliency of the tire and to insure a close joint where the ends meet that the rubber be compressed, so that the length of the tire is greater than the circumference of the wheel. The rubber must also be compressed sufficiently to leave the ends of the fastening band or wires free to permit same to be joined. In order to securely hold the tire within the rim, the fastening band or wires must have a given tension, as if same are loose the tire is very liable to spring out of the rim upon applying strong side pressure. Various devices have been invented to perform the desired functions; but same are generally complicated and expensive and require skill and long time in operating. Such devices should be of such a nature as to be easily and quickly operated by any man of average intelligence, and to this end this device has been designed, which will now be described.

In cutting tires for wheels the same are cut to lengths exceeding the circumference of the wheel to a predetermined extent and the fastening band or wires cut so as to project from both ends of the tire. Thus, as indicated in Fig. 3, the rivet end A of the fastening-band B projects a given distance beyond the end of the rubber tire C. A clip D is then placed on the band against the end of the rubber tire and engages the band, thus holding the band firmly in place with relation to said end of the tire C. The said clips D each consist of an L-shaped metal block of a width approximating that of the tire and provided adjacent the outer end of its longer leg with a transverse recess $d$, adapted to receive the fastening band or wires of the tire and clutch the same when tilted with two of the edges of said recess. The shorter leg of the block extends at a slightly-acute angle to the longer leg and is thicker, so as to present a large surface to the rubber tire. By placing said clip on the fastening band or wires in an inverted position and pressing the end of the shorter leg against the end of the rubber tire said clip will firmly engage the band or wires and hold same against receding into the tire. To prevent said clip from bending the band or wires when force is applied, I provide a block $e$ on the outer face of the longer leg, which is so placed relatively to the recess that one outer corner of the block comes into contact with said band or wires simultaneously with the adjacent edge of the recess.

By this means the pressure on the band is rendered less local, and thus renders it less liable to bend sharply.

Clamps E may be used in place of the clips D, but as same are more expensive than said clips and more difficult to handle the use of clips is preferable. The said clamp E consists of two members each provided at its lower end with a projection F, recessed on one face to receive an edge of said band B and suitably roughened in said recess to give it a firmer hold. Said members are brought into engagement with said band B by means of a bolt G. On their meeting edges adjacent their upper ends said members are each provided with a semicircular recess H, together forming a practically circular opening, the purpose of which will be hereinafter described. After said clip D or clamp E has been placed on the band, as above described, the rubber may be readily compressed by pulling upon the other end of the band and holding the corresponding end of the tire against movement. To effect this, a second clip D or clamp E is mounted in place adjacent the other end of said tire, and a plate D', provided with a recess to receive the band or wires, is placed against the compressing device, the clip D being adapted to engage the same. The said other end of the band or wires is then placed in the drawing device, (shown in Figs. 1 and 2,) which will now be described. This device consists of two parallel members I, adapted to be secured to one end of a table or work-bench by means of bolts J. Said members project at one end beyond the end of the table and are provided at said end with downwardly-extending projections K, in which the crank-shaft of a serrated roller L is journaled, said roller being so mounted relatively to the surface of the table or bench as to project above it about the distance that the band lies above the base of the tire. In vertical alinement with the bearings for said shaft of said roller L said members are provided with recesses to receive the shaft of a second roller L, said shaft being journaled partially in said recesses and partially in similar recesses in plate M, adjustably mounted upon upright bolts N, carried by said members I, said plates being adapted to enable the operator to regulate the pressure exercised upon the band by said rollers and to adjust same to receive varying thicknesses of bands between them. At their other ends said members I are provided with upwardly-extending projections, so as to provide sufficient surface at their rear ends to support the plate D, which is forced against said ends when drawing upon said band. After said clips or clamps have been mounted upon the band, as described, the last-named end of said band is placed between said rollers and the crank-shaft of said one roller turned, thereby drawing the band and compressing the rubber tire longitudinally between the clips or clamps on the fastening-band. As soon as the rubber has been compressed to the desired length the clip or clamp engaging the plate D' is thrown into engagement with the band and the crank-shaft reversed to release the end of the band. The clips or clamps then serve to retain the compression in the rubber tire, and the latter is then placed in position in the rim and brought to the device for placing the tension on the band.

The last-named device consists of two parallel standards O, secured at their ends in brackets P, which are preferably mounted on a wall. The said standards O carry a vertically-movable block Q, which in turn carries two pivotally-movable blocks R, which can be secured in any desired position with relation to said block Q by means of bolts S passing through said block Q. The said blocks R are provided with screw-threaded openings T, in which hand-screws U are mounted, the latter being each provided with a smooth end and an annular collar V separating same from the threaded portion. The said smooth ends of said hand-screws U are adapted to enter the openings H in said clamps E.

When the clips are used, pins $D^2$ are inserted transversely between the same and the ends of the rubber tire, and then pins are engaged by devices on the hand-screws and forced toward each other to place the band under tension. When clamps E are used in place of the clips D, the wheel containing the tire is set upon the floor and the height of said block Q adjusted to bring the ends of the hand-screws in alinement with the said openings in said clamps E. The said blocks R are adjusted to incline said screws to a position practically tangential to the periphery of the wheel. The said screws are then turned to insert the ends thereof into said openings H, and then said clamps are forced toward each other, thereby applying tension to the band or wires, one end of which is bent up, as shown, or cut off. When the proper tension has been attained, the longer end of the band is cut off to the proper point and perforated to receive the rivets carried by the other end and the ends of the band then secured together. The hand-screws are then reversed to release the clamps, and the latter and the plates D removed. The tire is then subjected to further action to bring the ends thereof together. The devices used in place of the clamps E, in connection with the clips D, consist of heavy blocks of metal provided with openings to receive the ends of the hand-screws and with recesses in their lower edges to receive or straddle the tire, the portions on each side of said lower recesses being adapted to engage the end portions of the pins $D^2$. The said bolt G of each clamp E is held against turning by means of a pin W, lying in the path of the head of said bolt, and said head is so arranged that when said clamps are engaged by the hand-screws said heads rest against the block Q, thereby preventing the clamps from being turned with said hand-screws while applying tension to the band. The said block Q is preferably attached to one end of a cord carrying a counterweight at its other end to balance said block, thereby rendering it easy to raise or lower said block. As shown in dotted lines in Fig. 1 the shafts of said rollers L may be geared together, but it has been found unnecessary to so gear them.

I claim as my invention—

1. In a tire-mounting device, the combination with a clamp adapted to hold the rubber against movement on the band in one direction, of a clamp adapted to be loosely mounted on said band, and devices engaging said band and said last-named clamp for forcing the latter against the rubber tire to compress the same on said band against said first-named clamp, said last-named clamp being adapted to automatically engage said band when said rubber tire is compressed to retain it in compression.

2. In a tire-mounting device, the combination with a clamp adapted to hold the rubber against movement on the band in one direction, of a second clamp adapted to be loosely mounted on said band, and devices engaging said band and said last-named clamp for forcing the latter against the rubber tire to compress the same on said band against said first-named clamp, said last-named clamp being adapted to automatically engage said band when said rubber tire is compressed to retain it in compression, and devices adapted to engage said clamps when said tire has been mounted on a wheel, to put tension upon the band and hold the ends of the latter in relative position to be secured together.

3. In a tire-mounting apparatus, the combination with clamps adapted to engage the fastening-band of a rubber tire, and the ends of the rubber tire, of a device engaging one of said clamps to hold same against movement, and devices engaging one end of said band for drawing same relatively to said last-named clamp to compress the rubber tire between said clamps, said last-named devices including two parallel serrated rollers engaging said band, and means for revolving said rollers.

4. In a tire-mounting device, the combination with clamps engaging the fastening-band of a rubber tire and engaging the ends of the rubber tire, of parallel serrated rollers adapted to receive one end of the band between them and draw the same when revolved, means for revolving same, and means for holding one of said clamps rigid with relation to said rollers, whereby when said band is drawn said rubber tire will be compressed between said clamps.

5. In an apparatus for mounting tires, the combination with parallel supports, parallel serrated rollers journaled therein and adjustable toward and away from each other, means for revolving said rollers, and a stop at one end of said supports, of clamps adapted to be mounted upon the fastening-band of a rubber tire against the ends of said rubber tire, one of said clamps being loosely mounted on said band and adapted to engage said stop while the adjacent end portion of said band is drawn through said roller, whereby the rubber tire is compressed, said last-named clamp being adapted to be secured to retain said compression in the rubber tire.

6. In an apparatus for mounting tires, the combination with clamps engaging the end portions of the fastening-band of a tire, of a device for tightening said band around the wheel, comprising a movable member held in guides, pivotally-movable blocks carried by said members, and hand-screws carried by said blocks and adapted to engage said clamps to move same in a direction to tighten said band.

7. In an apparatus for mounting tires, the combination with clamps adapted to engage the end portions of the fastening-band of a rubber tire, of a device for tightening said band around a wheel, comprising parallel guides, a member movable thereon, pivotally-movable blocks on said member, and hand-screws carried by said blocks and adapted to engage said clamps to move same in a direction to tighten said band, said clamps being adapted to abut against said movable member to hold them against turning.

8. The combination with a rubber tire and a fastening-band passing longitudinally therethrough, of clips adapted to engage said fastening-band and the ends of said rubber tire to retain compression in the latter, said clips being each provided with a recess adapted to receive the band, the walls of said recess being provided with sharp edges adapted, when said clip is turned, to clutch said band, said clips being each provided with an overhanging projection adapted to be engaged by the end of the rubber tire to turn said clip and cause the latter to clutch said band, substantially as described.

9. In an apparatus for mounting tires, the combination with a rubber tire and a fastening-band passing therethrough, and devices for compressing said rubber tire longitudinally on said band, of a clip adapted to engage said band and said rubber tire and actuated by the latter to engage said band to hold same rigid with the adjacent portion of said tire, said clip comprising a single piece of metal provided at one end with a projection adapted to engage the rubber tire, and adjacent its other end with a recess having sharp edges adapted to engage opposite sides of said band when said projection is engaged by said rubber tire.

In testimony whereof I affix my signature in presence of two witnesses.

RAYMOND B. PRICE.

Witnesses:
E. F. WILSON,
RUDOLPH WM. LOTZ.